US010336548B2

(12) United States Patent
Fenile et al.

(10) Patent No.: US 10,336,548 B2
(45) Date of Patent: *Jul. 2, 2019

(54) METHOD FOR FILLING THE POCKETS OF A TRANSPORT DEVICE IN THE FORM OF A SUSPENSION CONVEYOR AND DEVICE FOR CARRYING OUT SAID METHOD

(71) Applicant: FERAG AG, Hinwil (CH)

(72) Inventors: Roberto Fenile, Wetzikon (CH); Erich Kälin, Rapperswil (CH)

(73) Assignee: FERAG AG, Hinwil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,473

(22) Filed: Jun. 25, 2018

(65) Prior Publication Data
US 2018/0305131 A1 Oct. 25, 2018

Related U.S. Application Data

(63) Continuation of application No. 15/542,880, filed as application No. PCT/EP2016/050160 on Jan. 7, 2016, now Pat. No. 10,005,616.

(30) Foreign Application Priority Data

Jan. 26, 2015 (CH) ........................................ 0089/15
Apr. 27, 2015 (CH) ...................................... 0572/15

(51) Int. Cl.
*B65G 9/00* (2006.01)
*B65G 17/20* (2006.01)
(Continued)

(52) U.S. Cl.
CPC ............. *B65G 17/20* (2013.01); *B65G 9/004* (2013.01); *B65G 19/025* (2013.01); *B65G 47/38* (2013.01);
(Continued)

(58) Field of Classification Search
CPC ........ B65G 17/32; B65G 9/002; B65G 47/62; B65G 17/20; B65G 19/025; B65G 9/004; B65G 47/61; B65G 47/38
(Continued)

(56) References Cited

U.S. PATENT DOCUMENTS 3,338,179 A    8/1967 Klemm
3,533,499 A    10/1970 Harkess
(Continued)

FOREIGN PATENT DOCUMENTS

CH    00089/15    1/2015
CN    2511116 Y    9/2002
(Continued)

OTHER PUBLICATIONS

Chinese Patent Office, Text of First Office Action, Chinese Patent Application No. 201680007139.6 , dated Aug. 30, 2018 (12 pages).
(Continued)

*Primary Examiner* — Mark A Deuble
(74) *Attorney, Agent, or Firm* — Pauley Erickson & Kottis

(57) ABSTRACT

A method for filling the pockets of a transport device in the form of a suspension conveyor, the transport device including one or more trolleys which are movably mounted on a trolley track and on each of which a pocket hanging downwards for receiving transported goods is arranged, the pocket formed by at least one flexible material web that is planar when open and that is fastened at both ends to the trolley, forming a carrying loop or transport loop hanging downwards. The material web is releasably fastened by at least one end to the trolley. The method includes: a) advancing a closed pocket, b) opening the pocket by releasing the fastening of the material web to the trolley, c) filling the opened pocket with goods to be transported, d) closing the
(Continued)

pocket by fastening the material web to the trolley, and e) transporting away the filled and closed pocket.

7 Claims, 9 Drawing Sheets

(51) Int. Cl.
    *B65G 19/02*     (2006.01)
    *B65G 47/38*     (2006.01)
    *B65G 47/44*     (2006.01)
    *B65G 47/61*     (2006.01)
(52) U.S. Cl.
    CPC .............. *B65G 47/44* (2013.01); *B65G 47/61*
                      (2013.01); *B65G 2201/0238* (2013.01)
(58) Field of Classification Search
    USPC ........................................................ 198/465.4
    See application file for complete search history.

(56) References Cited

U.S. PATENT DOCUMENTS

| | | | |
|---|---|---|---|
| 4,104,156 | A | 8/1978 | Fletcher |
| 5,216,949 | A | 6/1993 | Bertozzi |
| 8,672,118 | B2 | 3/2014 | Janzen et al. |
| 10,005,616 | B2 * | 6/2018 | Fenile .................... B65G 17/20 |
| 2012/0037272 | A1 | 2/2012 | Wend et al. |
| 2012/0216917 | A1 | 8/2012 | Janzen |
| 2014/0291123 | A1 | 10/2014 | Olivieri |
| 2017/0369248 | A1 | 12/2017 | Fenile |
| 2017/0369250 | A1 | 12/2017 | Fenile et al. |
| 2018/0002115 | A1 | 1/2018 | Fenile et al. |
| 2018/0072511 | A1 | 3/2018 | Fenile |

FOREIGN PATENT DOCUMENTS

| | | |
|---|---|---|
| CN | 202320939 U | 7/2012 |
| CN | 203048067 U | 7/2013 |
| DE | 12 233 777 | 2/1967 |
| DE | 2 221 318 | 11/1973 |
| DE | 2 221 318 A1 | 11/1973 |
| DE | 81 33 433 | 4/1982 |
| DE | 38 40 521 A1 | 6/1990 |
| DE | 40 42 375 A1 | 12/1991 |
| DE | 689 07 399 T2 | 10/1993 |
| DE | 692 01 185 T2 | 5/1995 |
| DE | 297 09 547 U1 | 9/1997 |
| DE | 196 14 905 A1 | 11/1997 |
| DE | 103 09 127 A1 | 9/2004 |
| DE | 10 2004 018 569 A1 | 11/2005 |
| DE | 10 2004 018569 A1 | 11/2005 |
| DE | 10 20089 026 720 A1 | 12/2009 |
| DE | 10 2008 061685 A1 | 6/2010 |
| DE | 10 2010 033 905 A1 | 2/2012 |
| DE | 10 2010 053 590 A1 | 6/2012 |
| DE | 10 2011 015 138 A1 | 9/2012 |
| DE | 10 2011 101 987 A1 | 11/2012 |
| DE | 10 2012 108 757 A1 | 3/2014 |
| DE | 10 2012 018925 A1 | 3/2014 |
| DE | 10 2012 108757 A1 | 3/2014 |
| DE | 10 2013 205 172 A1 | 9/2014 |
| DE | 10 2014 203 298 A1 | 8/2015 |
| EP | 1 420 105 A1 | 5/2004 |
| EP | 1 420 106 A1 | 5/2004 |
| EP | 2 130 968 A1 | 12/2009 |
| EP | 2 196 415 A2 | 6/2010 |
| EP | 2 418 160 A1 | 2/2012 |
| EP | 2 620 394 A1 | 7/2013 |
| EP | 2 708 478 B1 | 3/2014 |
| EP | 2 786 940 A1 | 10/2014 |
| GB | 733 714 A | 7/1955 |
| GB | 733714 | 7/1955 |
| WO | WO 2015/124525 A1 | 8/2015 |
| WO | WO 2016/030274 A1 | 3/2016 |
| WO | WO 2016/030275 A1 | 3/2016 |

OTHER PUBLICATIONS

European Patent Office, German Language Office Action, European Patent Application No. 16 700 538.8, dated Nov. 26, 2018 (6 pages).

* cited by examiner

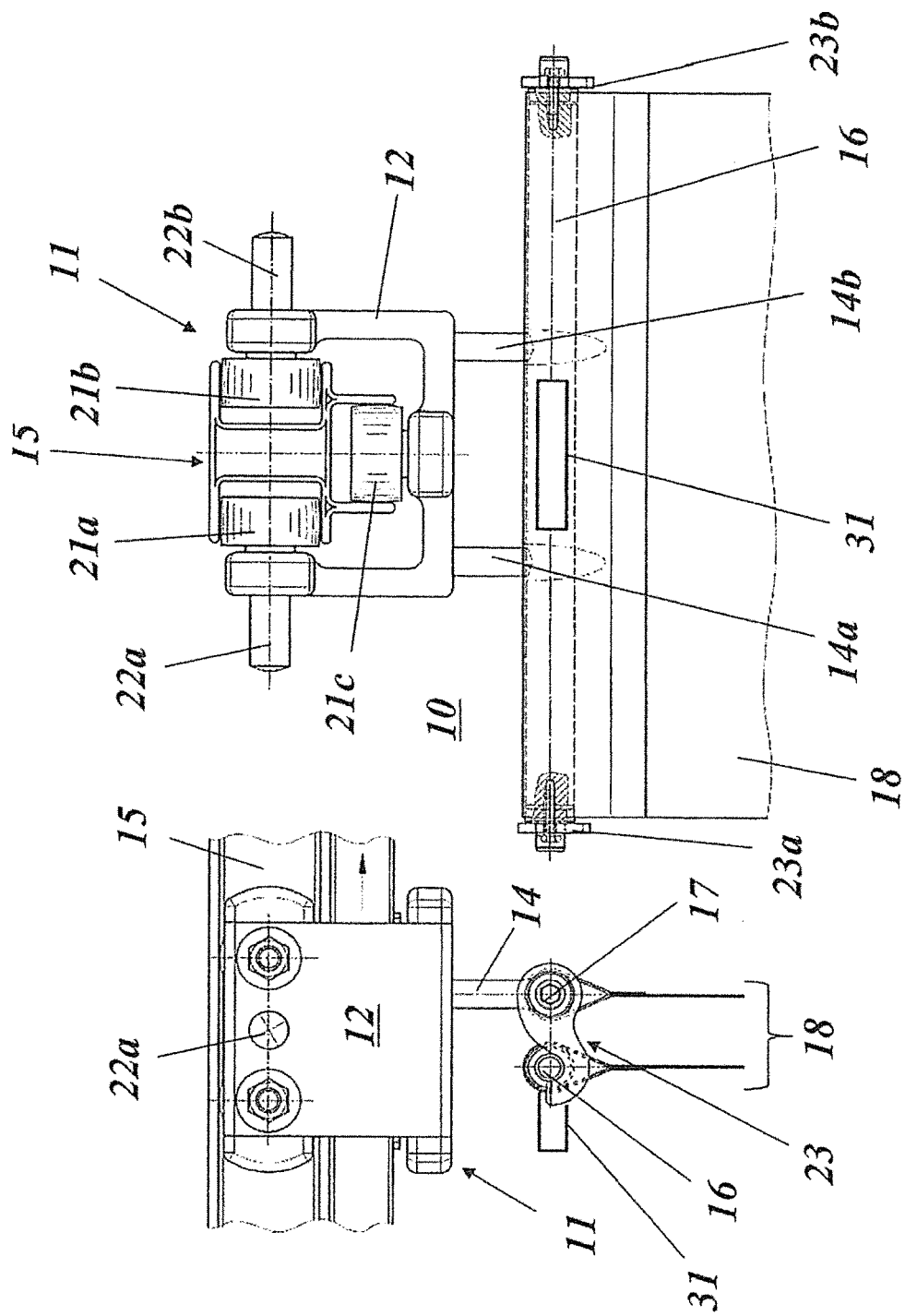

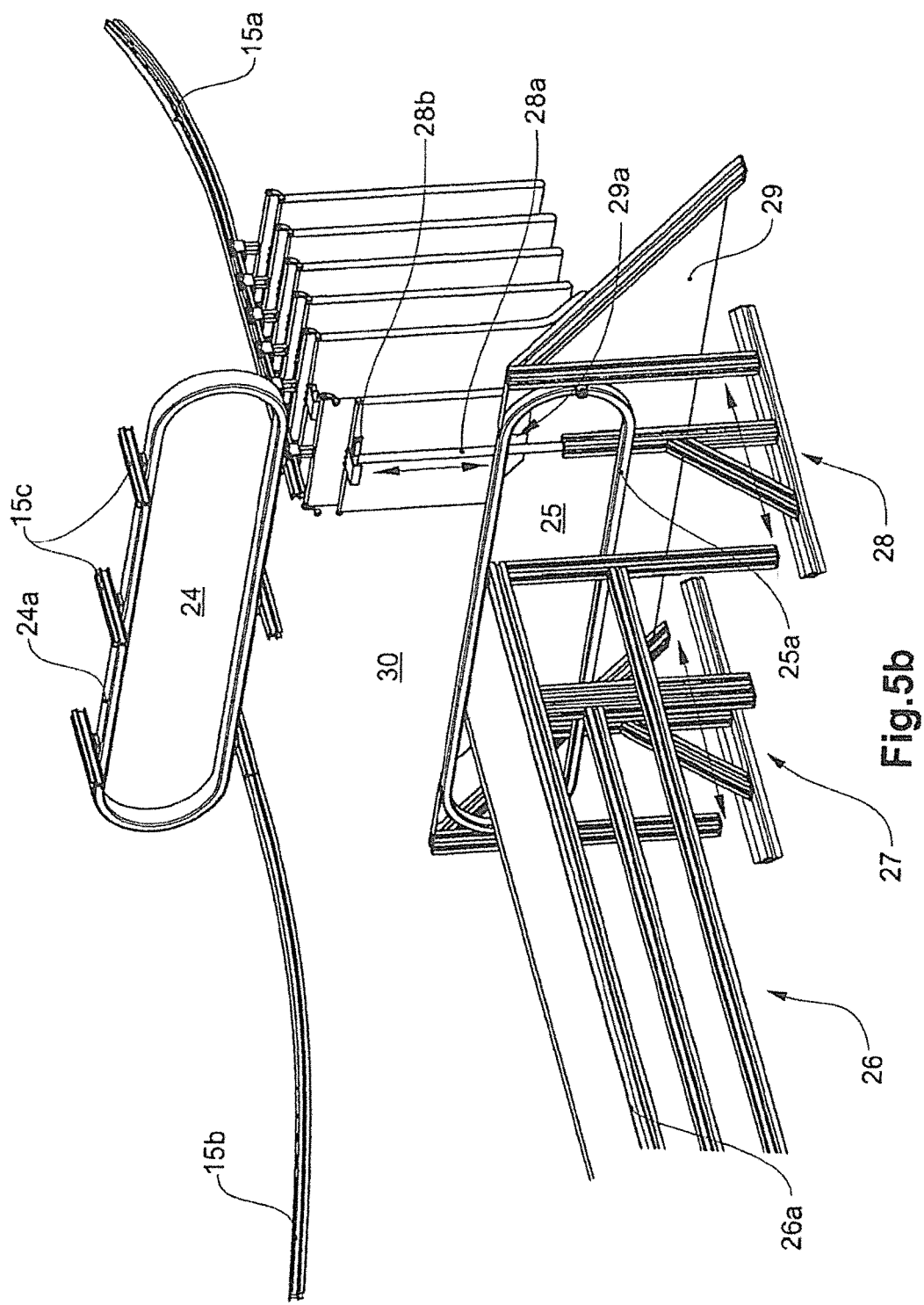

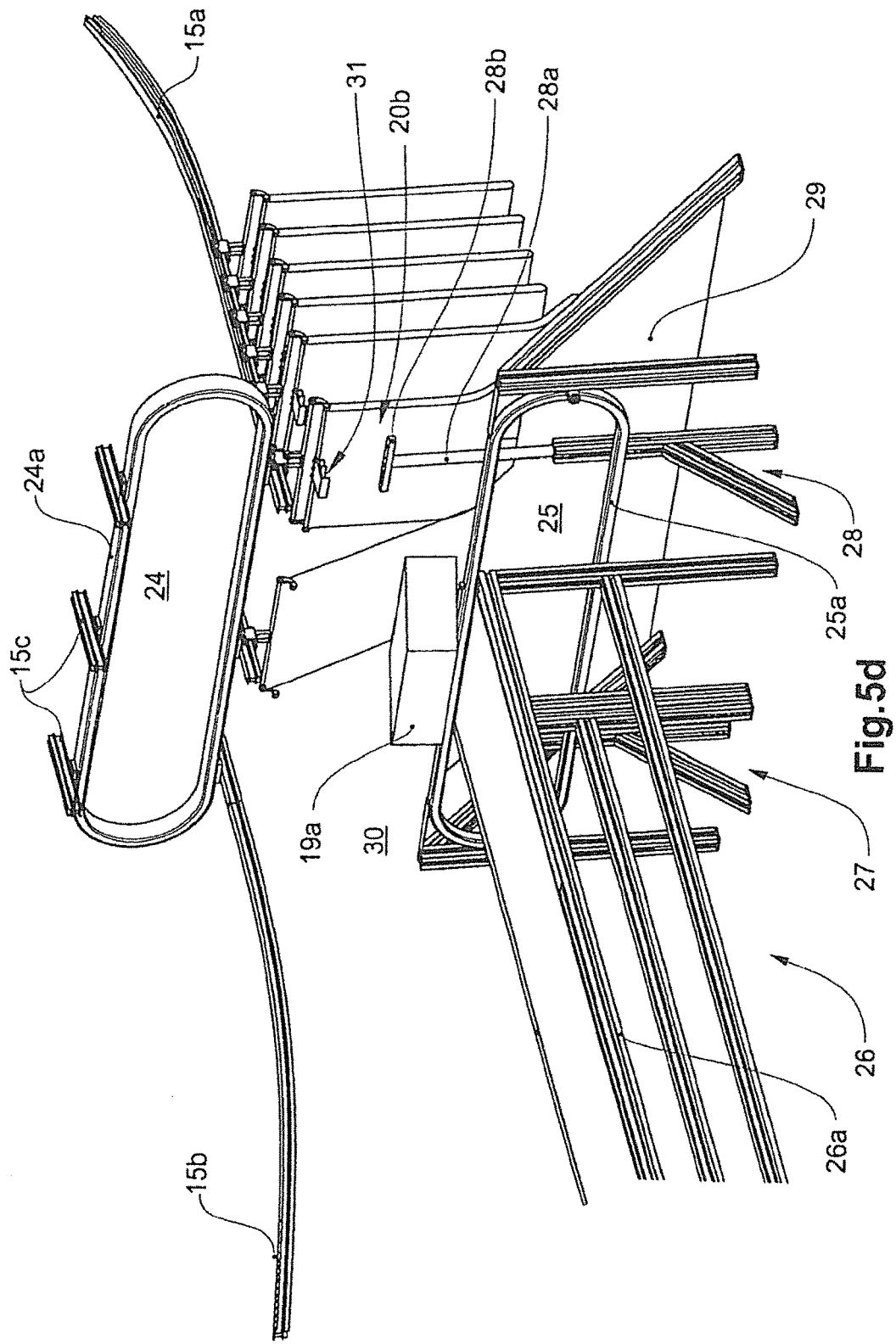

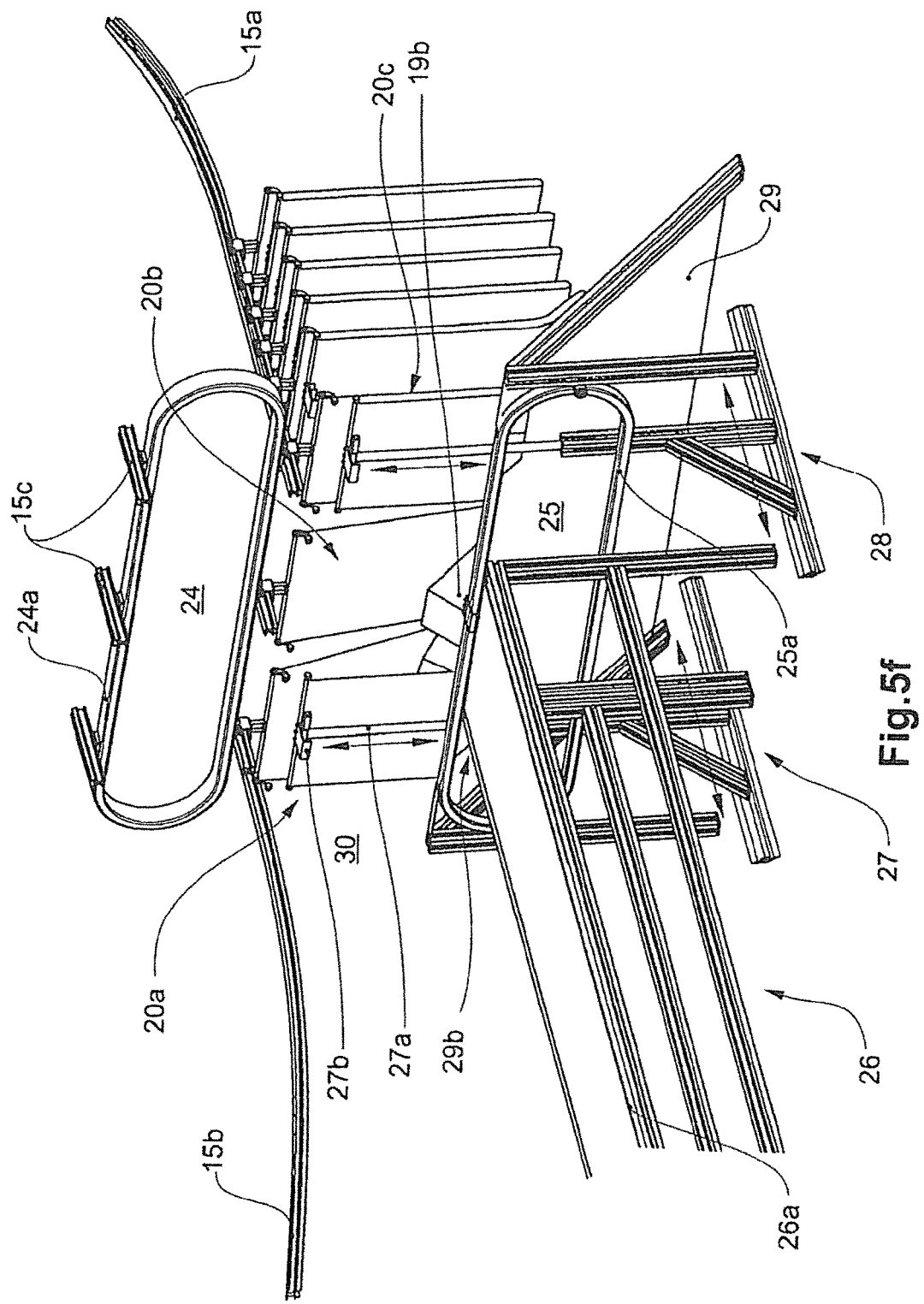

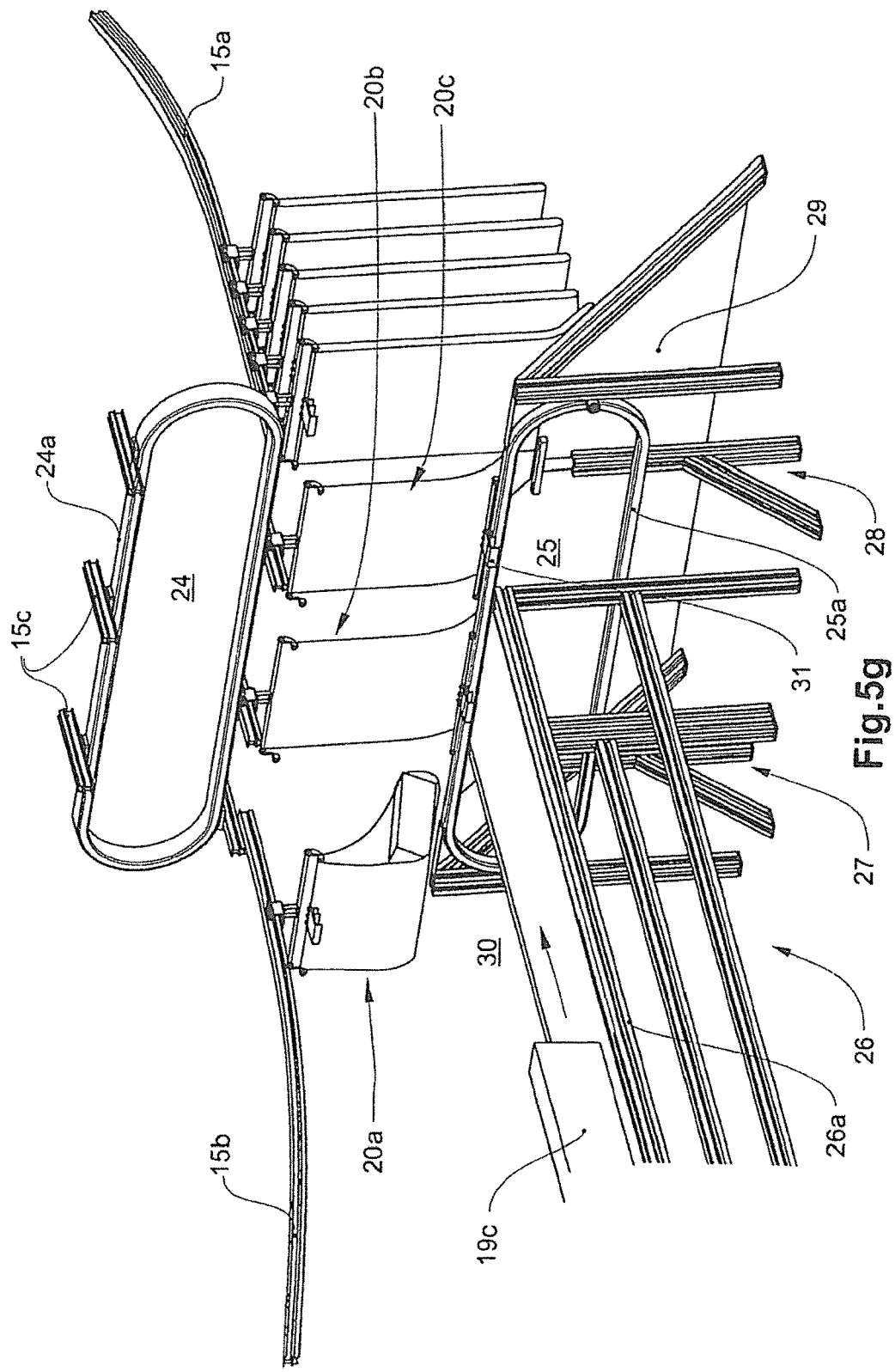

METHOD FOR FILLING THE POCKETS OF A TRANSPORT DEVICE IN THE FORM OF A SUSPENSION CONVEYOR AND DEVICE FOR CARRYING OUT SAID METHOD

CROSS-REFERENCE TO RELATED APPLICATIONS

This application is a continuation of U.S. patent application Ser. No. 15/542,880, filed on 11 Jul. 2017, issuing as U.S. Pat. No. 10,005,616 on 26 Jun. 2018, which is a National Phase Application of International Patent Application No. PCT/EP2016/050160, filed on 7 Jan. 2015, which claims the benefit of Swiss Patent Application CH 00089/15, filed 26 Jan. 2015 and Swiss Patent Application CH 00572/15, filed 27 Apr. 2015. The co-pending parent and related applications are hereby incorporated by reference herein in its entirety and are made a part hereof, including but not limited to those portions which specifically appear hereinafter.

BACKGROUND OF THE INVENTION

Field of the Invention

The present invention relates to the field of conveying technology. It relates to a method for filling the pockets of a transport device in the form of a suspension conveyor.

The invention further relates to a device for carrying out the method.

Discussion of Related Art

In the prior art a wide variety of suspension conveyors are known, in which the goods to be conveyed are received by transport pockets which are configured in a relatively complex manner and which are provided with complex opening and closing mechanisms which, in particular with a larger conveying system with many individual pockets, on the one hand, result in a significantly increased cost when setting up a new system and, on the other hand, in continuous operation have a greater susceptibility to malfunctions or complete functional failure.

The publication DE 10 2008 061 685 A1 discloses a loading station for transport pockets which are transported in a suspension conveyor system, comprising an upper supply rail for the transport pockets, comprising a vertical conveyor adjoining the supply rail for supplying the transport pockets into a lower loading position, comprising a device for opening the transport pockets in the loading position and comprising a lower discharge rail adjoining the vertical conveyor for discharging the transport pockets from the loading position.

The publication DE 10 2008 026 720 A1 discloses a transport pocket comprising a support wall which is provided at its upper region with a support coupling and a pivotable clamp, at its lower region with at least one coupling and at its upper region with means for opening the coupling and with means for closing the coupling, and comprising a bottom side wall which is flexible at least in the lower region and which is connected in its upper region to the pivotable clamp and in its lower region is provided with counter coupling means for receiving in the at least one coupling.

The publication DE 10 2011 101 987 A1 discloses a transport pocket for conveying conveyed goods in a conveying system, in particular a suspension conveying system, comprising a carrier part which is configured for receiving on a conveyor belt of the conveying system, comprising a loading aid for receiving the conveyed goods, wherein the loading aid comprises a closure flap which has a handling tab with a clamping portion, wherein the carrier part comprises a clamping device with a clamping lever which is able to be displaced between a retaining position in which a retaining force acts on the clamping portion and a released position, and wherein the clamping lever is coupled to the clamping portion in the retaining position, such that the received conveyed goods effect by the weight thereof an increase in the retaining force.

The publication DE 10 2012 108 757 A1 relates to a support pocket for a suspension conveying device for the suspended transport of objects, comprising a retaining frame, a pocket pouch which is suspended on the retaining frame and by which objects to be transported are able to be received, and a suspension element which is connected to the retaining frame and by means of which the support pocket is able to be suspended on the suspension conveying device, in order to be transported suspended from the suspension conveying device. The pocket pouch has a first pouch portion and a second pouch portion which in each case comprise a first pouch end portion connected to the retaining frame and a second pouch end portion remote from the retaining frame, wherein the second pouch end portions are connected together via a joint mechanism which is able to be brought into an unloading position in which the second pouch end portions are arranged spaced apart from one another, so that for dispensing objects the pocket pouch is provided with an outlet opening formed between the two pouch end portions and is able to be brought into a loading position in which the second pouch end portions are arranged adjacent to one another so that the outlet opening is closed and the pocket pouch is able to receive objects.

The publication DE 10 2013 205 172 A1 discloses a transport pocket for the suspended transport of goods. The transport pocket has a rigid carrying wall which in its upper portion in the transport position is connected to a carrying element for carrying the transport pocket in a suspended manner. A flexible goods-retaining wall forms with the carrying wall a carrying pocket which is closed downwardly at least in the transport position of the transport pocket and toward two opposing sides. The carrying wall is connected to the retaining wall between an upper wall connecting portion in the transport position and a lower wall connecting portion in the transport position, such that a length of the web-shaped retaining wall between the two wall connecting portions may be adapted in a variable manner to the transport of different goods. The design of the transport pocket is such that this longitudinal adaptation of the retaining wall takes place by a relative displacement of the retaining wall to the carrying wall at least in the region of one of the two connecting portions.

A novel transport device has been disclosed in a Swiss patent application filed on 26 Jan. 2015 CH 00089/15, in which laterally open pockets are formed from a material web by suspending on both ends, forming a loop, said pockets being able to be moved on running rails, suspended on a carriage. The pockets are opened by the one end of the material web being unhooked and closed again by the end of the material web being correspondingly hooked up.

SUMMARY OF THE INVENTION

It is the object of the invention, therefore, to provide a method for the automatic filling of such pockets and to provide a corresponding device for carrying out the method.

This and further objects are achieved by the features of the disclosed invention.

The method according to the invention is provided for filling the pockets of a transport device in the form of a suspension conveyor, which transport device comprises one or more carriages which are movably mounted on a running rail in the running rail direction and in each case a downwardly hanging pocket being arranged thereon for receiving transported goods, wherein the pocket is formed by at least one flexible material web which is planar in the open state and which is fastened at both ends to the carriage, forming a downwardly hanging carrying loop and/or transport loop, and wherein the material web is releasably fastened to the carriage on at least one end of the material web.

The method according to the invention includes the steps: (a) advancing a pocket in the closed state, (b) opening the pocket by releasing the fastening of the at least one end of the material web to the carriage, (c) filling the transported goods into the opened pocket, (d) closing the pocket by fastening the at least one end of the material web to the carriage, and (e) moving away the filled and closed pocket.

One embodiment of the method according to the invention is that the pocket is advanced via a first running rail and in that the filled and closed pocket is moved away via a second running rail which is arranged offset relative to the first running rail.

In particular, the pocket is transported by means of a filling device from the first running rail to the second running rail and the filling of the pocket is undertaken in the filling device, during the transport from the first running rail to the second running rail.

The pocket in this case is transported suspended on a running rail section specifically during the transport in the filling device, which running rail section corresponds to a portion of the running rail and which optionally is able to be connected to one end of the first running rail and/or the second running rail.

A further embodiment of the method according to the invention is that the at least one end of the material web is releasably configured on the carriage by hooking up the one end, in that in step (b) the at least one end of the material web is unhooked, and in that in step (d) the at least one end of the material web is hooked up again.

In particular, in this case the other end of the material web is fixedly connected to the carriage.

Specifically, a grip element is arranged on at least one end of the material web, wherein for unhooking and/or hooking up the material web an unhooking device and/or hooking-up device grips and lifts and/or lowers the at least one end of the material web on the grip element.

A further embodiment of the method according to the invention is that in step (c) the open pocket is held open, by the material web with its at least one released end bearing and being supported against an obliquely located support surface, forming an approximately V-shaped opening between the two ends of the material web.

The device according to the invention for carrying out the method according to the invention in the form of a filling device comprises a first device for opening the pocket, a second device for filling the open pocket and a third device for closing the filled pocket, wherein the three devices are arranged one behind the other and separately from one another in a transport direction for the pocket.

One embodiment of the device according to the invention is that the filling device is arranged between the end of a first running rail, via which pockets to be filled are able to be advanced, and the start of a second running rail spaced apart from the end of the first running rail, via which filled pockets are able to be moved away, and in that the filling device comprises transport devices which are configured for the transport of pockets from the end of the first running rail through the first, second and third devices to the start of the second running rail.

In particular, the filling device comprises an upper transport device and a lower transport device which are arranged parallel to one another and the movements thereof are synchronised with one another, wherein the upper transport device is configured for the transport of the carriage of a pocket and the lower transport device is configured for the transport of the at least one end of the material web released from the carriage.

In this case, the upper transport device specifically comprises an endlessly circulating transport means which carries a plurality of running rail sections which in each case are able to be adjoined in a flush and seamless manner to the end of the first running rail and/or to the start of a second running rail, for receiving and/or transferring carriages.

In this case, the lower transport device specifically comprises an endlessly circulating transport means with which a grip element on at least one end of the material web is able to be brought into engagement after releasing the fastening to the carriage.

In this case, an obliquely located support surface is specifically arranged parallel to the two transport devices, during the transport of a pocket through the filling device the material web of the pocket bearing and being supported thereon with its at least one released end, forming an approximately V-shaped opening between the two ends of the material web.

The support surface may in this case, for example, be configured statically in the form of a plate or the like. However, it may also be implemented by a belt moved therewith.

In particular, in this case the at least one end of the pocket is able to be hooked up to the carriage for closing the pocket, wherein the first device is configured as an unhooking device and comprises a mechanically movable actuating rod, an engagement element being arranged at the end thereof, said engagement element being able to be brought into engagement with the grip element on at least one end of the material web for opening the pocket.

Moreover, the third device may be configured as a hooking-up device and comprise a mechanically movable actuating rod, an engagement element being arranged at the end thereof, said engagement element being able to be brought into engagement with the grip element on at least one end of the material web for closing the pocket.

A further embodiment of the device according to the invention is that the second device is configured as a supply device for supplying transported goods to the open pocket and in that the supply device comprises a conveying member.

In particular, the conveying member may be a transport belt.

BRIEF DESCRIPTION OF SEVERAL VIEWS OF THE DRAWINGS

The invention is intended to be described in more detail hereinafter with reference to exemplary embodiments, in combination with the drawings, in which:

FIG. 3 shows in a side view a further example of a transport device suitable for the present invention with a running rail, carriage and a material web, which is able to be hooked up to form a pocket, in the hooked-up state;

FIG. 4 shows the device of FIG. 3 viewed in the direction of travel;

FIG. 5B shows an exemplary embodiment of a device according to the invention comprising one step when filling pockets of the type shown in FIGS. 3 and 4 which are advanced and moved away via separate running rails.

FIG. 5D shows an exemplary embodiment of a device according to the invention comprising one step when filling pockets of the type shown in FIGS. 3 and 4 which are advanced and moved away via separate running rails;

FIG. 5F shows an exemplary embodiment of a device according to the invention comprising one step when filling pockets of the type shown in FIGS. 3 and 4 which are advanced and moved away via separate running rails; and FIG. 5G shows an exemplary embodiment of a device according to the invention comprising one step when filling pockets of the type shown in FIGS. 3 and 4 which are advanced and moved away via separate running rails.

DETAILED DESCRIPTION OF THE INVENTION

Figure 2:
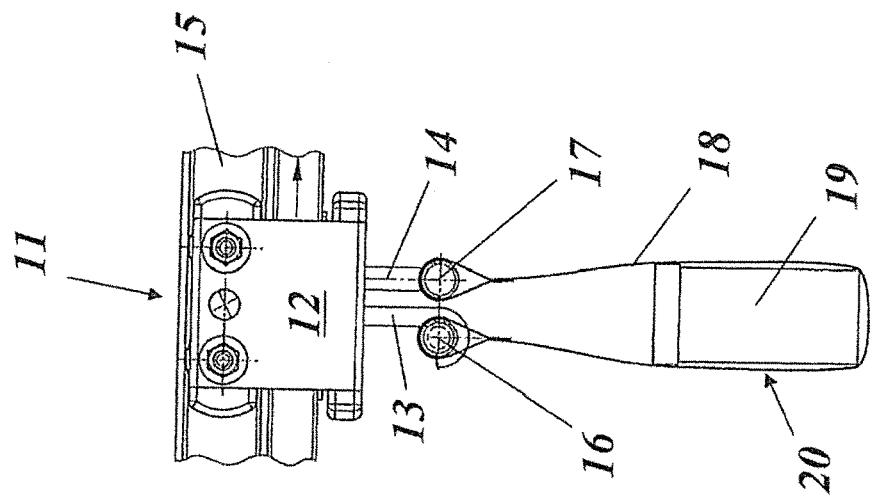
FIG. 2 shows in a side view the device of FIG. 1 with a hooked-up material web forming a pocket and transported goods transported therein.
Figure 1:
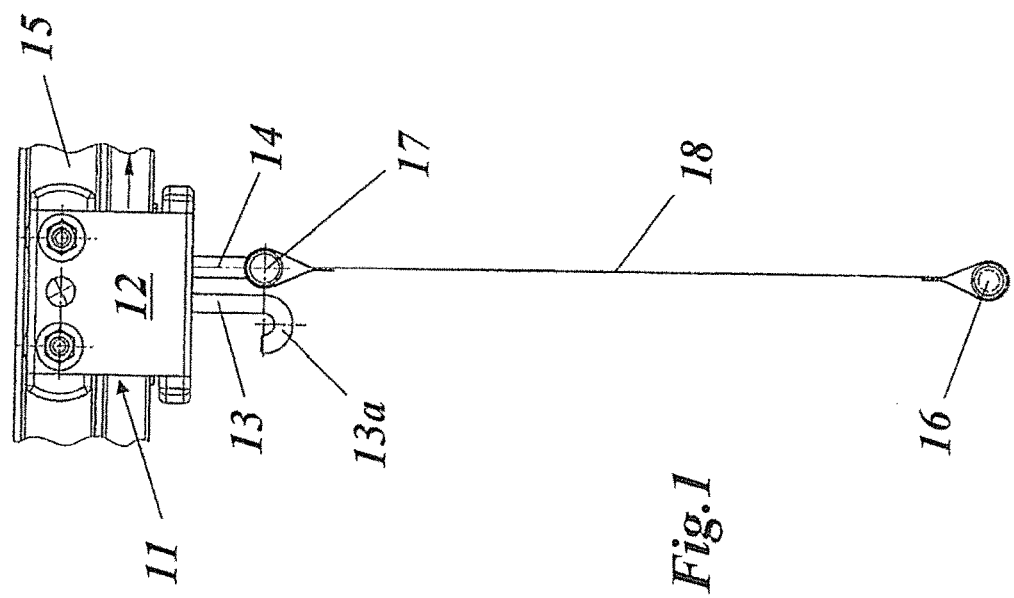
FIG. 1 shows in a side view an example of a transport device suitable for the present invention with a running rail, carriage and a material web, which is able to be hooked up to form a pocket, in the unhooked state.

The transport device 10' of FIGS. 1 and 2 comprises a running rail 15 extending in a direction of conveyance (arrow in FIG. 1) and extending horizontally in the example of FIG. 1, said running rail in the example shown being produced from a metal strip bent repeatedly in a symmetrical manner relative to a vertical central plane and comprising two opposing support rails and a guide rail configured in the bottom in the center having a rectangular profile. A carriage 11, which is suspended on the running rail 15, is movably guided in the direction of the rail. The carriage 11 has a U-shaped carriage body 12 (see FIG. 4) which on both arms in each case bears a pair of supporting rollers 21a and 21b and in the lower region bears guide rollers 21c by which it engages in the running rail 15 laterally and from below.

Between the lateral roller pairs 21a and 21b, in each case a drive element 22a and 22b protruding outwardly to the side is attached to the carriage body 12, said drive element being able to bring the carriage, if required, into engagement with a drive device, a braking device, a switching device or the like. Protruding vertically downwardly from the lower base of the U-shaped carriage body 12 is a pair of fastening elements 14 and/or 14a, b (FIG. 4) spaced apart transversely to the rail direction and a pair of support elements 13 arranged to the rear thereof in the direction of travel.

The two rod-shaped fastening elements 14 and/or 14a, b are fixedly connected at the lower end to a first transverse rod 17 extending horizontally and transversely and symmetrically to the rail direction. The supporting elements 13 with the associated hook 13a receive a second transverse rod 16 which is arranged parallel to the first transverse rod 17 and which, as it were, may be "hooked into" the hook 13a and removed again or unhooked.

Each of the two transverse rods 16 and 17 is placed in an associated stitched loop of the pocket 20 configured at the end of a rectangular material web 18 which has a predetermined width and length. In the unhooked state (FIG. 1) the material web 18 is only suspended on the carriage 11 via the transverse rod 17 and vertically downwardly with the free transverse rod 16 and thus has the shape of a planar web. In the hooked-up state (FIG. 2) in which the transverse rod 16 is suspended in the hook-shaped supporting elements 13, the material web 18 forms a carrying loop or transport loop and/or pocket 20 which is open to the side, transported goods 19 to be conveyed, for example a packet, small package or the like, being able to be inserted therein.

The exemplary embodiment of FIGS. 3 and 4 which shows a transport device 10 differs from the exemplary embodiment of FIGS. 1 and 2 (transport device 10') in that the hook-shaped supporting elements 13 attached to the carriage body 12 are entirely dispensed with and instead hooks 23 and/or 23a, b are attached to the outer ends of the transverse rod 17 for receiving the transverse rod 16.

Proceeding from this exemplary embodiment of a transport device, the present invention is intended to be described in more detail hereinafter by the exemplary embodiment of a filling device. FIGS. 5A-G in this case show different chronological images of an animation which reproduces a filling process using this filling device schematically and in a highly simplified manner.

Figure 5A:
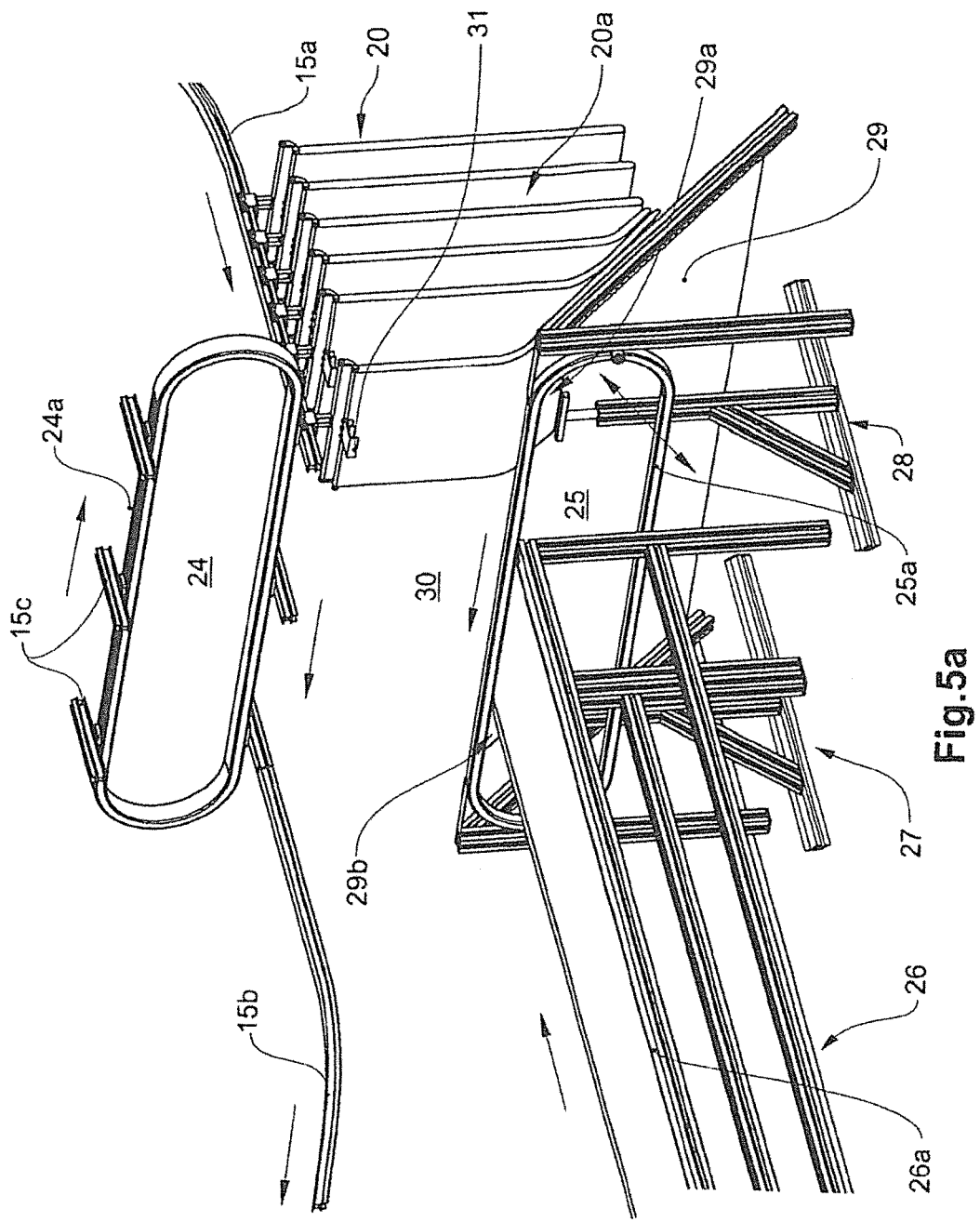
FIG. 5A shows an exemplary embodiment of a device according to the invention comprising one step when filling pockets of the type shown in FIGS. 3 and 4 which are advanced and moved away via separate running rails.

According to FIG. 5A, the exemplary filling device 30 is arranged between the end of a first running rail 15a, via which pockets 20 are supplied to the filling device 30, and the start of a second running rail 15b, via which the filled pockets are moved away. In the example, the two running rails 15a and 15b are offset laterally relative to one another transversely to the direction of travel. However, other configurations are also conceivable, for example a vertical offset of the running rails.

The filling device 30 has two transport devices 24 and 25 bridging the lateral offset between the running rails 15a and 15b, which in each case comprise an endlessly circulating transport means (chain, belt or the like) 24a and/or 25a, and move synchronously with one another in the direction of the arrows illustrated in FIG. 5A. The drives and guide elements of the transport devices 24 and 25 are not shown for the sake of simplicity.

The circulating transport means 24a of the upper transport device 24 carries a plurality of running rail sections 15c which are equally spaced apart from one another and which have in each case the same profile as the running rails 15a and 15b and in specific positions of the transport means 24 may be brought into engagement with the running rails 15a and 15b, such that the pockets 20 with their carriage 11 may be transferred without transitions from the running rail 15a to an adjoining running rail section 15c and/or from the running rail section 15c to the adjoining running rail 15b. The transport device 24 is thus able to take a pocket 20 with its carriage 11 from the running rail 15a and then transport it, transversely to the direction of travel, to the running rail 15b and discharge it again there.

Figure 5C:
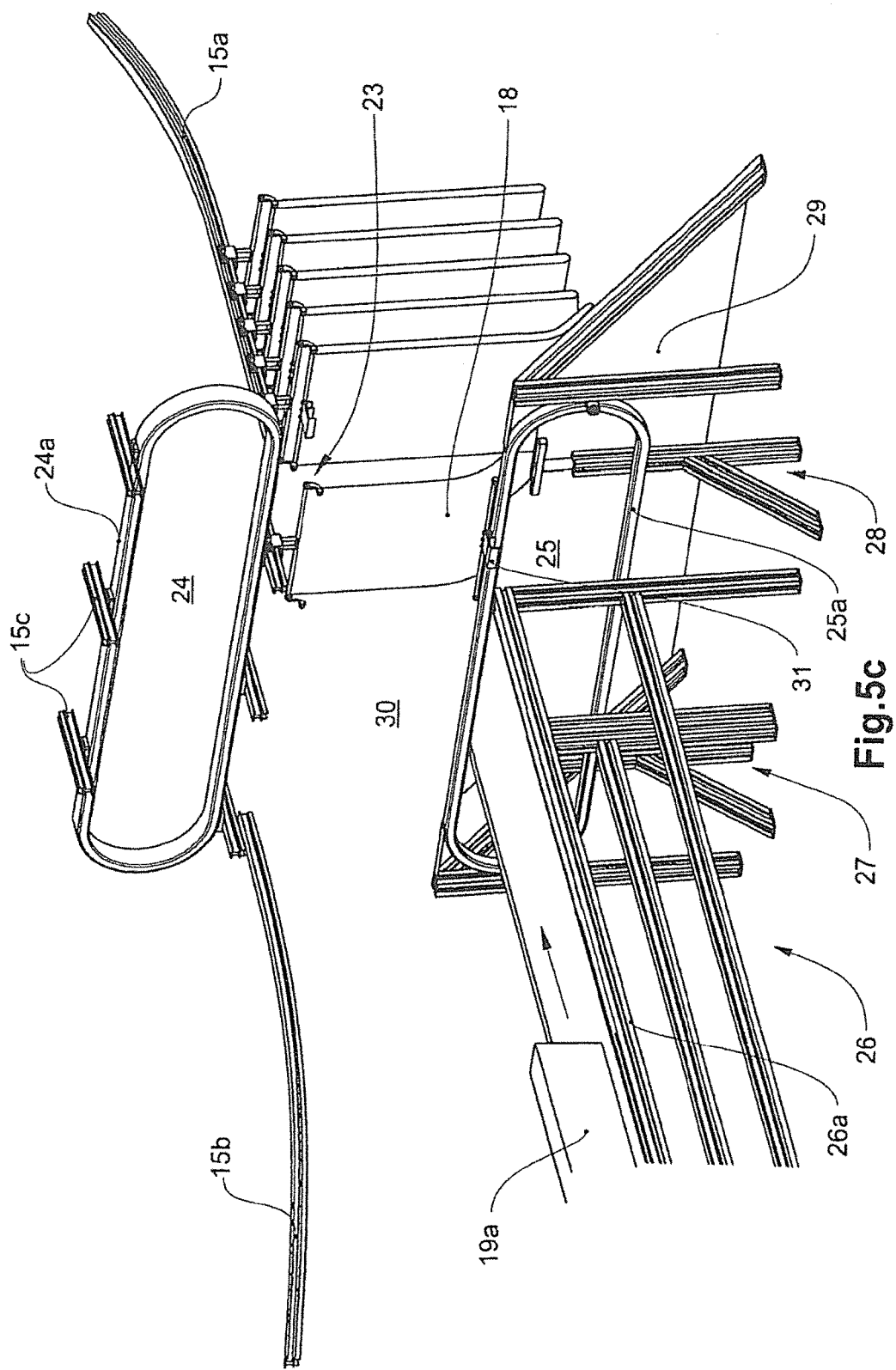
FIG. 5C shows an exemplary embodiment of a device according to the invention comprising one step when filling pockets of the type shown in FIGS. 3 and 4 which are advanced and moved away via separate running rails.

The circulating transport means 25a of the lower transport device 25 at the same time receives a grip element 31 which is fastened on the outside to the transverse rod 16 of a pocket 20a which is able to be unhooked, when the pocket 20a has been opened by unhooking the transverse rod 16, and the unhooked end of the material web 18 has been lowered with the grip element 31 onto the transport device 25 (FIG. 5C). The opened pocket 20 and/or 20a is transported by means of the two transport devices 24 and 25 at the same time transversely to the running rails 15a and 15b through the filling device 30 and at the same time filled (FIG. 5D) and closed again (FIG. 5F). In order to keep the open pocket stable, an obliquely located support surface 29 is provided, the upper edge thereof adjoining the upper run of the lower transport device 25 and against which the material web 18 bears from the unhooked transverse rod 16 as far as its loop.

For opening (unhooking) and closing (hooking up) the pocket 20 and/or 20a, an unhooking device 28 and a hooking-up device 27 which are automatically actuated are arranged at the start and at the end of the filling device. The unhooking device 28 has a vertically movable actuating rod 28a, a transversely located engagement element 28b being fastened to the free end thereof, by which the actuating rod 28a may be brought into engagement with the grip element 31 of a pocket 20 and/or 20a in order to unhook the front transverse rod 16 of the pocket 20 and/or 20a (FIG. 5B). So that this is possible, the actuating rod 28a may be advanced by its drive mechanism to the pocket to be opened (FIG. 5B) through a recess 29a in the support surface 29 in the rail direction. Correspondingly, the hooking-up device 27 with its actuating rod 27a and its engagement element 27b may be advanced through a recess 29b in the support surface 29 in the rail direction onto the pocket to be closed (FIG. 5F).

A supply device 26 is arranged between the unhooking device 28 and the hooking-up device 27 in the filling device 30, via which the transported goods to be filled into the pockets, for example a packet 19a (FIG. 5c), may be supplied and diverted into the open pocket. In the exemplary embodiment of FIG. 5, the supply device 26 is provided with a transport belt 26a which terminates at the upper edge of the guide surface 29.

FIGS. 5A-G show that three pockets 20a, 20b and 20c may be processed at the same time by means of the illustrated filling device 30:

In FIG. 5A, the first pocket 20a to be filled is still unopened with its carriage on a running rail section 15 of the upper transport device.

In FIG. 5B, the unhooking device 28 with its actuating members 28a and 28b is moved forward through the recess 29a in the direction of the running rail 15a and by vertically extending the member below the grip element 31 of the pocket 20a has unhooked the front transverse rod 16 and thus opened the pocket.

In FIG. 5C, by retracting the actuating member 28a and 28b the unhooking device 28 has deposited the unhooked end of the pocket and/or material web 18 with the grip element 31 on the lower transport device 25 and both transport devices 24 and 25 have already transported the open pocket a further distance in the transverse direction to the supply device 26.

In FIG. 5D, the first pocket 20a is located upstream of the supply device and is filled with a packet 19a. At the same time, at the start of the filling device 30 a second pocket 20b is slipped forward and is opened by the unhooking device 28 in the manner already disclosed.

Figure 5E:
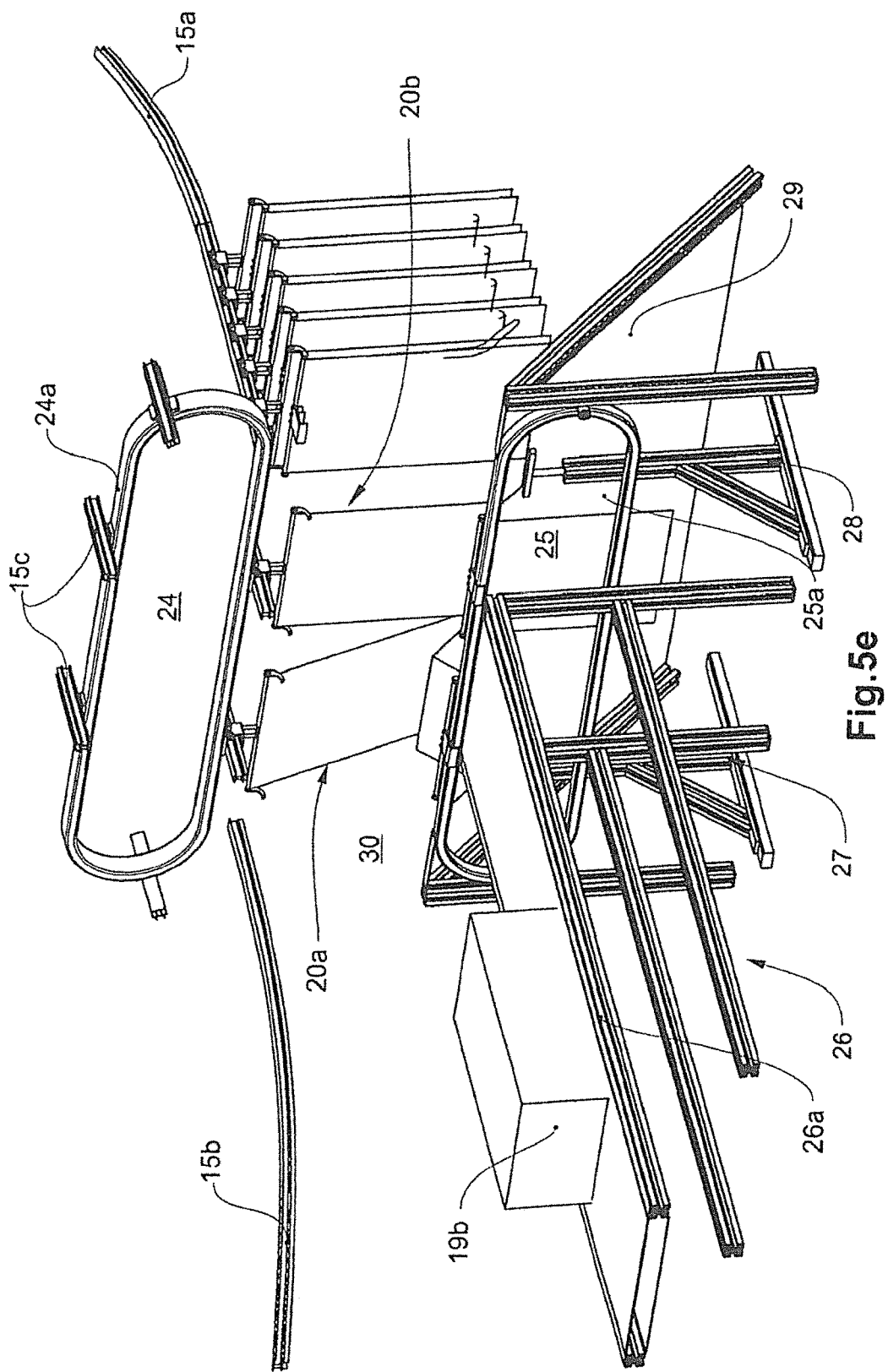
FIG. 5E shows an exemplary embodiment of a device according to the invention comprising one step when filling pockets of the type shown in FIGS. 3 and 4 which are advanced and moved away via separate running rails.

In FIG. 5E, the filled open first pocket 20a is transported further to the hooking-up device 27 for closing, whilst at the same time the second pocket 20b enters the region of the supply device 26 which has already advanced a further packet 19b.

In FIG. 5F, the first pocket 20a is closed by means of the hooking-up device 27 and the second pocket 20b is filled with the packet 19b, whilst a third pocket 20c is being opened by the unhooking device 28.

In FIG. 5G, finally the first pocket 20a, which is filled and closed, is moved away via the running rail 15b, the second pocket 20b is filled and the third pocket 20c is opened and ready for transverse transport.

We claim:

1. A transport device in the form of a suspension conveyor with a filling device for filling pockets, the transport device comprising:
    a first device for opening the pockets;
    a second device for filling the opened pockets; and
    a third device for closing the filled pocket, wherein the first device, the second device, and the third device are arranged one behind the other and separated from one another in a transport direction for the pockets, wherein advancing the pockets is carried out via a first running rail, and that moving away the filled and closed pockets is carried out via a second running rail which is arranged offset with respect to the first running rail.

2. The transport device according to claim 1, wherein the pockets can be transported from the first running rail to the second running rail by means of the filling device, the filling of the pocket being carried out in the filling device during the transport from the first running rail to the second running rail.

3. The transport device according to claim 1, wherein the filling device is arranged between the end of a first running rail, via which pockets to be filled can be advanced, and the beginning of a second running rail, spaced apart from the end of the first running rail, via which filled pockets can be moved away.

4. The transporting device according to claim 3, wherein the filling device comprises transporting devices which are designed for transporting pockets from the end of the first running rail through the first, second and third devices to the beginning of the second running rail.

5. The transport device according to claim 1, wherein a running rail portion is provided in the filling device for the suspended transport of the pockets, which corresponds to a section of the running rail and which can optionally be connected to one end of the first running rail or second running rail.

6. The transport device according to claim 1, wherein the second device is designed as a feeding device for feeding transported goods to the opened pockets, and in that the feeding device includes a conveying member.

7. The transport device according to claim 6, wherein the conveying member comprises a transport belt.

* * * * *